United States Patent [19]
Carr

[11] 3,855,546
[45] Dec. 17, 1974

[54] FOLDED LOBE LARGE OPTICAL CAVITY LASER DIODE

[75] Inventor: David L. Carr, Plano, Tex.

[73] Assignee: Texas Instruments Incorporated, Dallas, Tex.

[22] Filed: Sept. 21, 1973

[21] Appl. No.: 399,565

[52] U.S. Cl.............................. 331/94.5 H, 357/18
[51] Int. Cl............................................... H01s 3/00
[58] Field of Search..... 331/94.5 H, 94.5 D, 94.5 T, 331/94.5 C; 317/235 N

[56] References Cited
UNITED STATES PATENTS

| | | | |
|---|---|---|---|
| 3,290,539 | 12/1966 | Lamorte | 317/235 N |
| 3,316,464 | 4/1967 | Hilsum | 331/94.5 H |
| 3,514,715 | 5/1970 | Kosonocky | 331/94.5 H |
| 3,790,902 | 2/1974 | Miller | 331/94.5 C |

OTHER PUBLICATIONS

Kressel et al., "Low Threshold LOC GaAs Injection Lasers," Applied Physics Letters, vol. 18, pp. 43–44, Jan. 15, 1971.

*Primary Examiner*—Edward S. Bauer
*Attorney, Agent, or Firm*—Harold Levine; James T. Comfort; James O. Dixon

[57] ABSTRACT

An improved large optical cavity laser diode in which a beam reflecting surface is formed as part of the diode package to provide a folded lobe having a beam divergence which is reduced to 25° or less and requires no alignment for proper operation.

8 Claims, 5 Drawing Figures

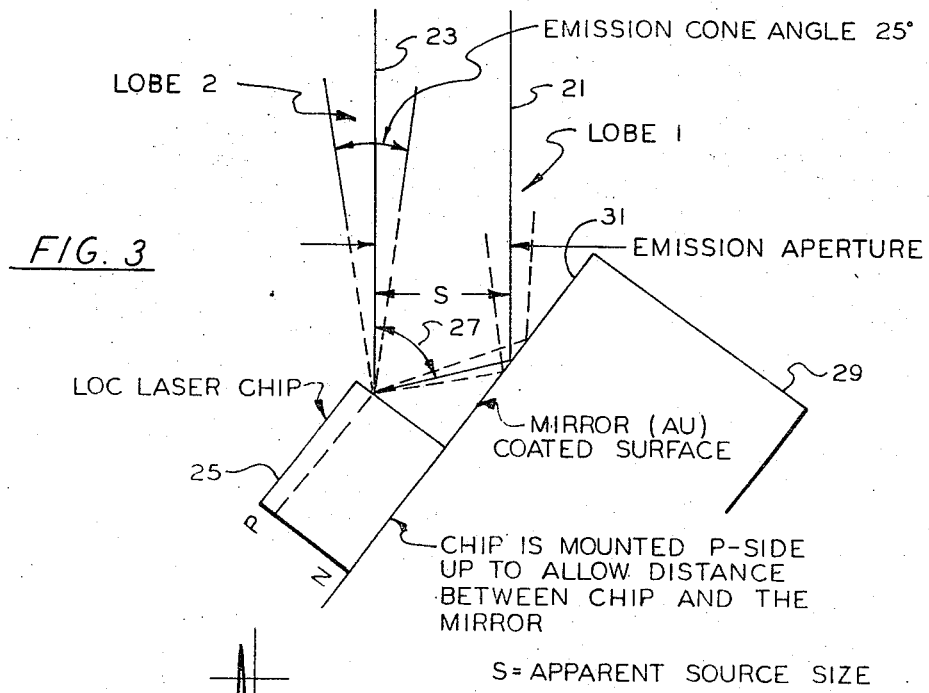
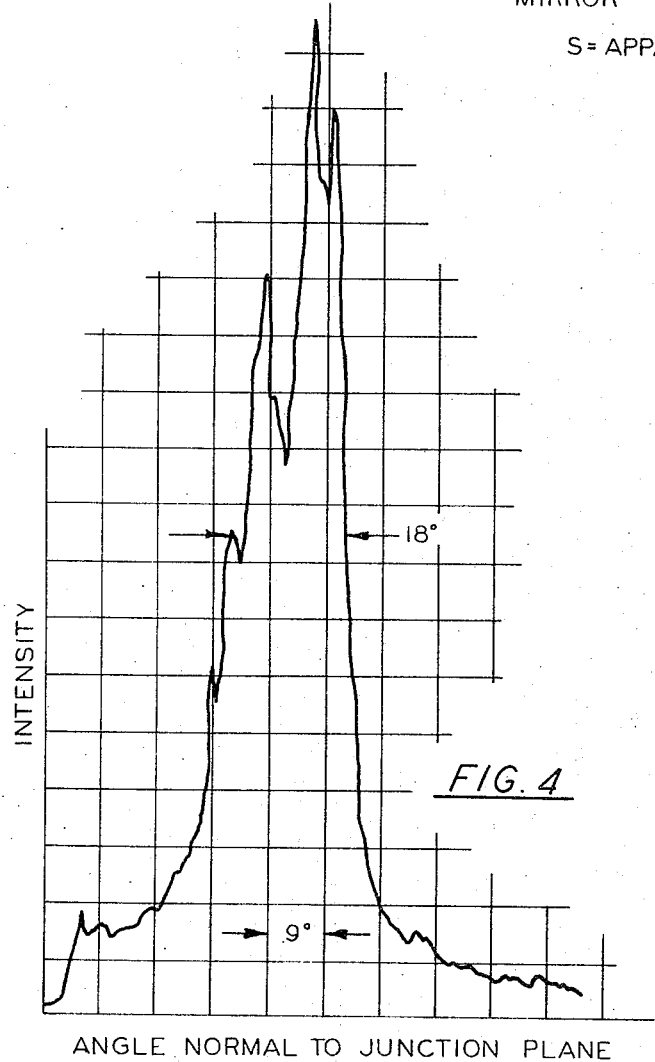
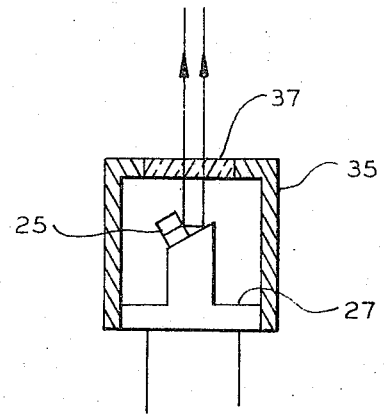

FOLDED LOBE LARGE OPTICAL CAVITY LASER DIODE

BACKGROUND OF THE INVENTION

The invention relates to lasers in general and more particularly to an improved large optical cavity laser diode. Of the presently available injection lasers, the large optical cavity laser diode has been found to be superior to a single heterostructure GaAlAs laser in a number of respects. The large optical cavity laser has a greater peak emission power because of a reduction of power density at the emission face. Further, it is able to operate at temperatures in excess of 70°C. This latter property is of extreme importance when the laser is to be used in military application such as for bomb fuses. Despite the superior properties the large optical cavity structure has not been completely practical. In its simplest form, it produces an emission beam which has an angle of 60°–70° between its half-intensity points whereas the single heterostructure laser has a beam angle of only approximately 30°. The wide beam angle is the result of emission in the form of two or more lobes. Because of this wide beam angle, optical systems to collimate the beam have had to be large and bulky. These large optical systems tend to negate the advantages of the laser diode as an infra-red light source. Because of the large optical cavity laser's aforementioned advantages various attempts have been made to reduce the beam angle. For example, attempts have been made to obtain a narrower beam angle through adjustment of the aluminum content of the epitaxial layers of which the diode is made. Another approach has been through the use of fiber optic ribbons to capture the two main lobes emitted and to bring them together by bending the fibers into a parallel configuration. Although some success in reducing beam angle has been achieved through the adjustment of aluminum content, this has been found to inevitably lead to devices having lesser power, poorer reproducibility and low degradation thresholds. The disadvantages of the use of fiber optics are obvious in that the structure becomes much more complex and light losses are increased. Thus, it can be seen that there is need for an improved large optical cavity laser which has a reduced beam diameter while still maintaining it's higher peak emission power.

SUMMARY OF THE INVENTION

The present invention provides a large optical cavity laser diode which has all of the superior properties noted above while still having a beam divergence which is 25°or less. Reduction of the beam divergence angle is obtained by mounting the laser chip on a mirror coated surface. The chip is mounted so that one of the two major lobes emitted by it is reflected so as to have its major axis parallel to the major axis of the other lobe. The result is divergence equal to only that experienced with a single lobe. Although this arrangement slightly increases the apparent source size, this is not a serious disadvantage for most devices. By mounting the chip directly on a reflecting source, the package is properly adjusted during manufacturing and no external adjustments or alignments are needed for proper operation. The improved folded lobe large optical cavity laser diode is useful in all injection laser diode applications except where an extremely small source size is of paramount importance. In particular it provides a device having high peak power and capable of high ambient temperature operation such as is required in range finding systems and in communication systems.

BRIEF DESCRIPTION OF THE DRAWINGS

FIG. 3 is a plan view of the preferred embodiment of the present invention showing the laser chip of FIG. 1 mounted to a base having a reflecting surface.

FIG. 4 is a plot of intensity versus angle normal to the junction plane for the device according to FIG. 3.

FIG. 5 is an elevation view of the laser diode of the present invention mounted on a header.

DETAILED DESCRIPTION OF THE PREFERRED EMBODIMENT

Figure 1:
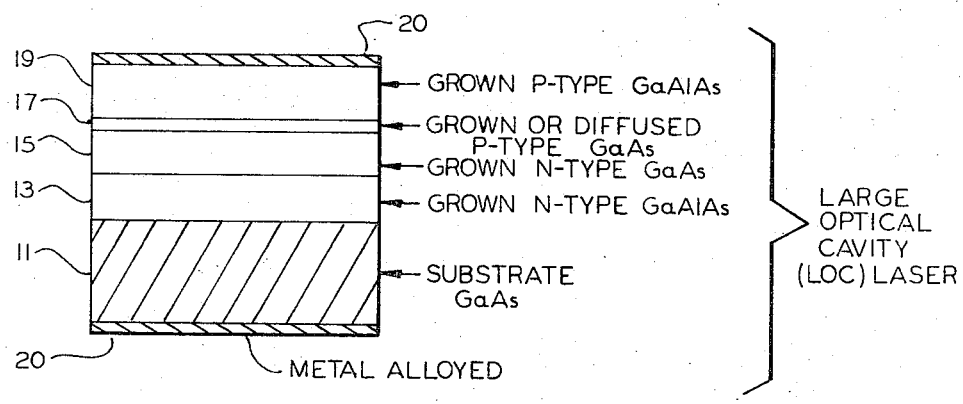
FIG. 1 is a cross-sectional view of a large optical cavity laser structure.

As shown on FIG. 1 the laser structure of a large optical cavity laser comprises s substrate 11 of GaAs on top of which is grown an N-type GaAlAs layer 13. Atop this layer is a grown P-type GaAlAs layer 19. In conventional function, metal 20 may be alloyed to the top and bottom of the chip. Such large optical cavity lasers and the manner of making such are known in the art.

Figure 2:
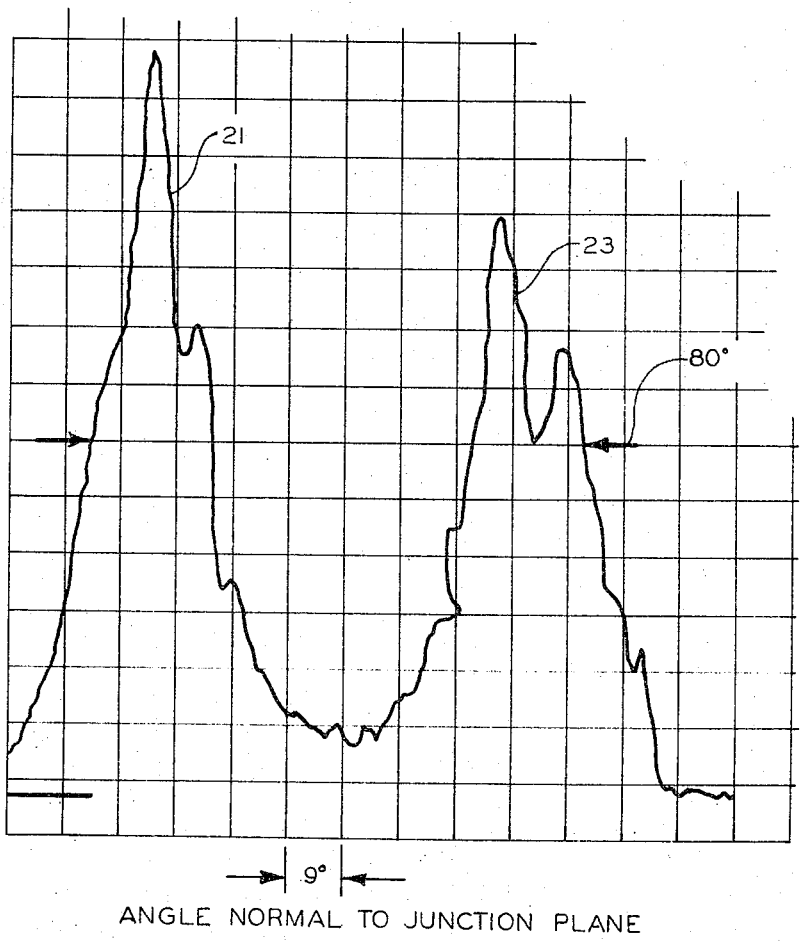
FIG. 2 is a plot of the intensity versus the angle normal to the junction plane for the large optical cavity laser of FIG. 1.

FIG. 2 illustrates the beam intensity of such a laser versus the angle normal to the junction plane. As shown, two lobes designated 21 and 23 are formed at the P junction. Each of the lobes has a beam divergence of 25° or less at its half-intensity point. However, the angle separation of the two lobes 21 and 23 results in an overall beam divergence of approximately 80°. As noted above, because of this wide divergence angle, previously used collimating optical systems were of such a size as to lose the advantages of the large optical cavity laser.

The two lobes are also illustrated on FIG. 3. Thus the lobes 21 and 23 which are emitted from the P junction of the laser chip 25 are shown having a large angle therebetween indicated by reference numeral 27. As shown on FIG. 3 the chip 25 is mounted on a base member 29 having a mirror surface 31. Typically the mirror coated surface 31 may comprise a coating of gold. Such coating may be done in conventional fashion using plating or evaporation techniques. The chip is mounted with its P side up to allow sufficient distance between the junction and the mirror to obtain the required reflections. That is the chip 25 will normally be soldered to the base member 29. Since some solder will extend beyond the junction it is desired to have the illustrated distance. Alternatively the chip can be pressed between two solids eliminating the need for solder. In that case the P side may be down resulting in a smaller beam diameter. As shown, the axis of lobe 21 is reflected by the mirror coated surface 31 to be parallel to the axis of the lobe 23. the result is an overall beam which has a beam divergence which is no greater than that associated with a single lobe, i.e., 25°or less. The arrangement does however increase the apparent beam diameter to the diameter indicated as S. In typical applications this dimension will not exceed 10 mils.

FIG. 4 illustrates a plot of intensity versus angle normal to the junction plane for a device fabricated according to the present invention. As shown, thereon the beam divergence at half-intensity is only 18°. Even with large optical cavity diodes which have more than two lobes improved results will be obtained.

FIG. 5 illustrates a typical mounting for the large optical cavity diode 25. As shown, the base member 27 is a copper header in a conventional semiconductor package. Each run of diodes will produce diodes of equal lobe divergence and the header angle may easily be matched thereto. A can 35 with a window 37 may then be placed over the header 27 to complete the package.

The increased apparent source size S is acceptable in most cases. Thus, the high peak emission power of the large optical cavity laser and its good operating characteristics have been maintained while in decreasing its beam divergence to less than that of a heterostructure laser. Although a specific embodiment of the invention has been illustrated and described it will be obvious to those skilled in the art that various modifications may be made without departing from the spirit of the invention which is intended to be limited solely by the appended claims.

What is claimed:

1. An improved large optical cavity laser diode arrangement comprising: a) means having at least one plane surface which is light reflecting; and b) an optical cavity laser diode mounted on said plane surface such that one of the two major lobes emitted by the laser diode is reflected so as to have its major axis parallel to the major axis of the other lobe.

2. The invention according to claim 1 wherein said optical cavity laser diode comprises: a) a substrate; b) a grown N-type GaAlAs layer atop said substrate; c) a grown N-type GaAs layer atop said N-type GaAlAs layer; d) a P-type GaAs layer atop said GaAs N-type layer; and e) a grown P-type GaAlAs layer atop said P-type GaAs layer.

3. The invention according to claim 2 wherein the substrate of said laser diode is mounted on said plane surface.

4. The invention according to claim 1 wherein said plane surface is coated with gold 5. The invention according to claim 1 wherein said plane surface comprises the surface of a header of a semiconductor package.

6. The invention according to claim 5 wherein the surface of said header on which said laser diode is mounted is in a plane making an angle with the axis of said header which angle is equal to one half the beam divergence angle of the two major lobes emitted by said laser diode.

7. The invention according to claim 6 wherein said laser diode has metal alloyed at least to the side contacting said header and said diode is soldered to said header.

8. The invention according to claim 7 and further including a case surrounding said diode and header said case having a window for the beam emitted by said diode.

* * * * *